United States Patent [19]

Nashimoto

[11] 4,229,662
[45] Oct. 21, 1980

[54] WIRING OF ELECTRICAL EQUIPMENTS FOR MOTORCYCLES

[75] Inventor: Ryo Nashimoto, Tokyo, Japan

[73] Assignee: Honda Giken Kogyo Kabushiki Kaisha, Tokyo, Japan

[21] Appl. No.: 950,274

[22] Filed: Oct. 11, 1978

[30] Foreign Application Priority Data

Oct. 13, 1977 [JP] Japan ................. 52-122887

[51] Int. Cl.³ ............. H01H 85/20; B60L 3/04
[52] U.S. Cl. ................................... 307/9; 361/430
[58] Field of Search ............ 180/33 R, 34, 35; D13/35; 361/357, 360, 430, 431; 307/9, 147

[56] References Cited

U.S. PATENT DOCUMENTS 4,000,447  12/1976  Codrino ............... 361/157 X

OTHER PUBLICATIONS

Workshop Manual for the BMW/R60/6, R75/6, R90/6, R90S, p. 227.

Primary Examiner—L. T. Hix
Assistant Examiner—James L. Dwyer
Attorney, Agent, or Firm—Irving M. Weiner; John L. Shortley; Melvin Yedlin

[57] ABSTRACT

Wiring of electrical equipment for motorcycles having a battery for a current source provided in the central part of the body of a motorcycle. A plurality of electrical loads are connected to the battery, and a plurality of sub-fuses are connected to each electrical load. In order to simplify the wiring and to facilitate the wiring installation as well as maintenance, the sub-fuses are concentratedly provided in a position proximal a steering stem of the motorcycle.

8 Claims, 5 Drawing Figures

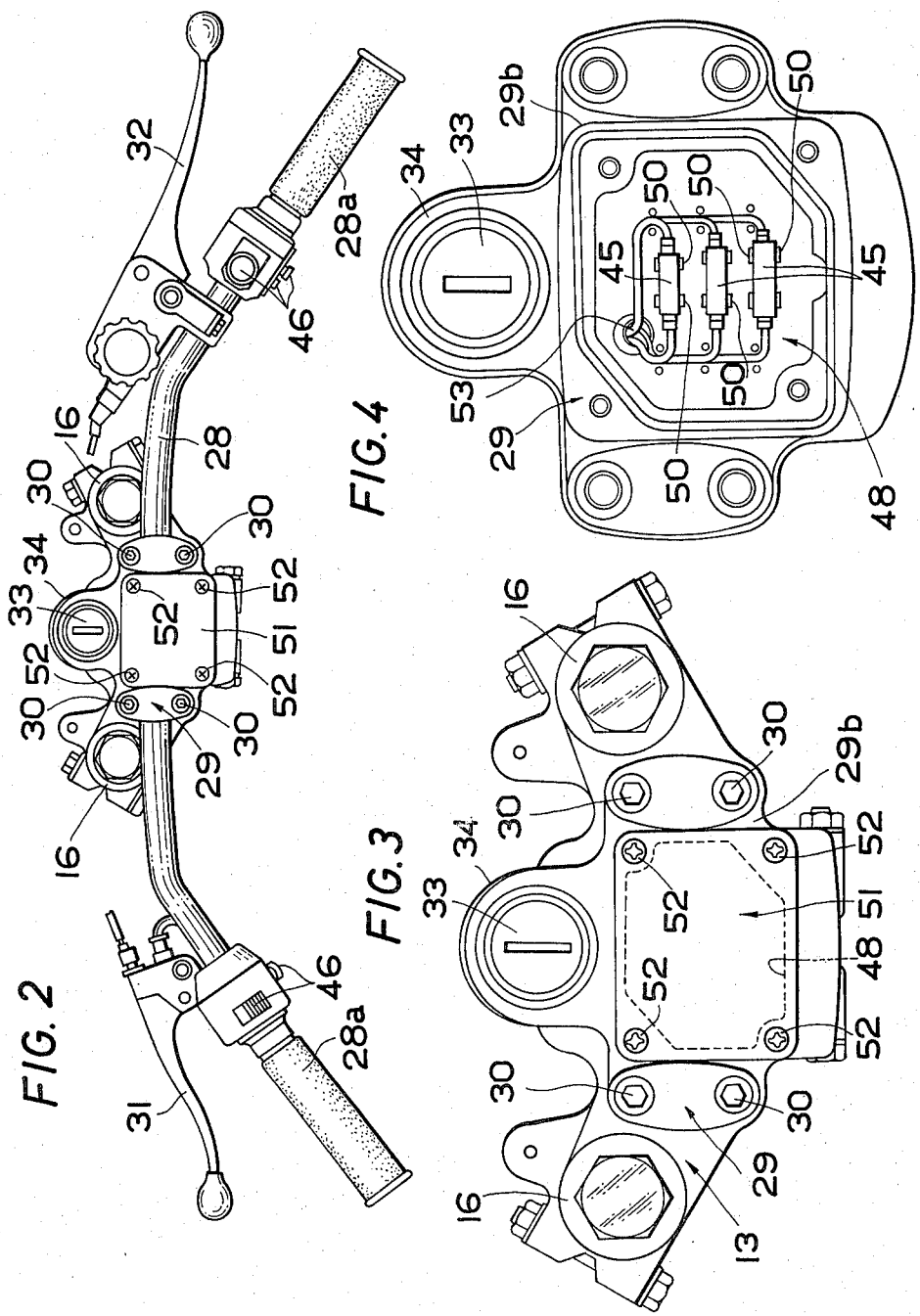

WIRING OF ELECTRICAL EQUIPMENTS FOR MOTORCYCLES

The present invention relates to an electrical wiring system, and to the wiring of electrical equipment for motorcycles wherein sub-fuses are provided between electrical loads and a battery, and for each electrical load.

BACKGROUND OF THE INVENTION

The conventional motorcycle is provided with a plurality of switches on and in the vicinity of the handlebar so that operations such as actuating lights and/or horns may be easily done while driving. These switches are connected to respective electrical loads, such as headlights, taillights, flashing lights, turn signals, and ignition coil. In addition, a switch provided on the brake operating lever is connected to a stoplight.

Sub-fuses for preventing an overload current are connected to each of these various load circuits, to which a current source voltage from a battery by way of current source is fed through a combination switch and a main fuse. The battery is arranged in the central part of the cycle body. The main fuse is connected to the battery at one end and to the respective load circuits at the other end through wire harnesses. The sub-fuses are connected individually to the respective loads, are positioned downstream of the main fuse, and are arranged so that when the respective load circuits malfunction, the sub-fuses for feeding the current source voltage to the loads may be checked and replaced as required.

In such a conventional wiring structure for a motorcycle, because the sub-fuses are arranged near the main fuse or the battery, the distances between the sub-fuses and the switches for the respective loads provided on or near the handlebar become very lengthy. Also, the lines connecting the battery with the sub-switches and with the loads become very lengthy.

For example, when the sub-fuses are provided near the battery or main fuse, they are far from the headlight, taillight, and other loads provided in the front or rear parts of the cycle body because the current source voltage is fed from the battery and main fuse to first the main and sub-switches provided in the vicinity of the handle bar, the next the sub-fuses in the returning direction, and then lastly to the loads. Consequently, the wire harnesses provided between such components are very lengthy, and the wiring is very inconvenient.

Therefore, when the respective load circuits are wired, the wiring becomes complicated and long; a number of the wire harnesses are required; the outside diameters of the harnesses grow larger; and the wiring fixtures and fixing portions increase. Also, complicated wiring work with many working steps are required. Moreover, the complication of the wiring is not desirable with respect to maintenance, such as servicing, inspections, and repairs.

Furthermore, depending on the sub-fuses setting positions, the riding seat and the like will have to be removed, the body frame will have to be inspected from below, and an awkward and unnatural posture will have to be taken in a very narrow place by a maintenance person to do the maintenance work.

The present invention effectively solves the aforementioned problems caused by the conventional wiring of load circuits and arrangement of sub-fuses for motorcycles.

SUMMARY OF THE INVENTION

The present invention provides an electrical wiring system for a motorcycle, comprising an electrical battery, a main switch, and an electrical conductor operably and electrically connecting said main switch to said electrical battery. The wiring system also includes a plurality of electrical equipment, and a plurality of sub-switches operably and electrically connected to each of said electrical equipments, respectively. The sub-switches are disposed adjacent the handlebars of the motorcycle. The system also includes a plurality of sub-fuses operably anf electrically connected between said main switch and each of said sub-switches respectively. The plurality of sub-fuses are disposed adjacent the steering stem of said motorcycle.

An object of the present invention is therefore to provide wiring of electrical equipment for motorcycles wherein the wiring structure can be simplified, the wire harness arrangement can be simplified, the harness length can be reduced to as short as possible, and the performance of maintenance, such as the replacement and inspection of the sub-fuses, can be improved.

For such purposes, the present invention provides: wiring of electrical equipment for motorcycles having a battery arranged substantially in the central part of the cycle body; a main switch connected with the battery; and sub-switches for respective electrical loads arranged downstream of the main switch and on or near a handlebar, wherein a plurality of sub-fuses are concentratedly arranged in a position proximal a steering stem.

Another object of the present invention is to provide wiring of electrical equipment for motorcycles wherein the sub-fuses are easily inspected and replaceable when the load circuits malfunction. Thus, maintenance is improved, and the sub-fuses are provided on rigid members, such as a top bridge and a front fork assembly, so that the safety is insured against external forces, such as impacts, and that a dead space on the motorcycle can be effectively utilized.

The present invention further provides wiring of electrical equipments for motorcycles wherein a fuse box is provided on the top bridge which carries a handlebar and a front fork assembly rotatably with respect to a head tube of frame body, so that sub-fuses for respective loads may be contained and arranged in the box with a removable lid.

A preferred embodiment of the present invention is described in detail below with reference to the accompanying drawings.

BRIEF DESCRIPTION OF THE DRAWINGS

FIG. 2 is a plan view of a handlebar with accessories attached to a top bridge.

FIG. 3 is a plan view of the top bridge.

FIG. 4 is a plan view of a handlebar upper-holder for fixing the handlebar upon the top bridge.

DETAILED DESCRIPTION

Figure 1:
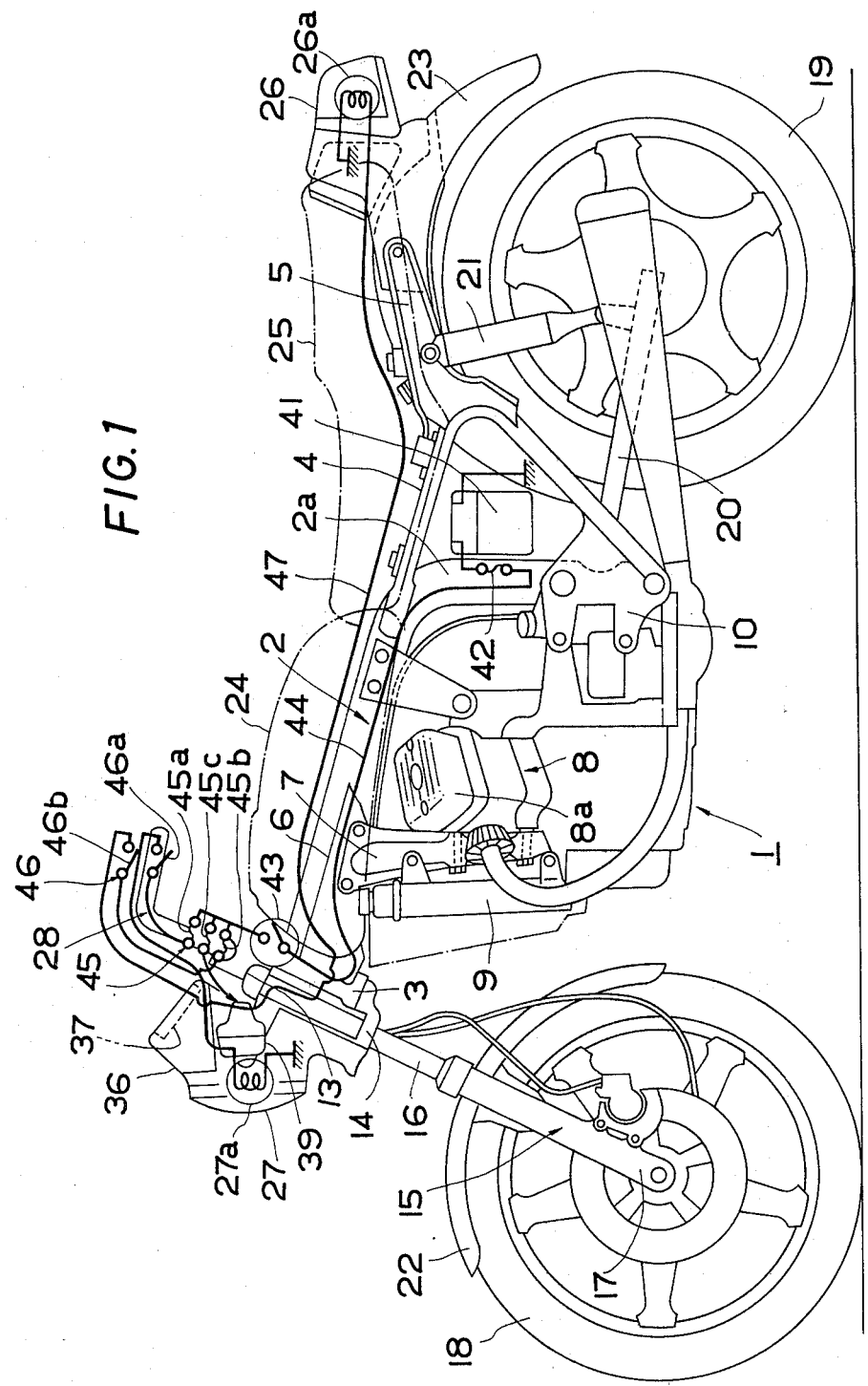
FIG. 1 is a schematic side view of a motorcycle, diagrammatically showing electrical equipment and harnesses.

Referring to FIG. 1, a motorcycle 1 is shown having a main frame pipe 2 extended rearwardly from a head tube 3. A rear part of the frame pipe 2 is bent and suspended downwardly in the central part of the cycle body to form a center pillar 2a. Sub-frames 4, laterally directed V-shaped in a side view, are secured at both free ends to upper and lower ends of pillar 2a on both sides of the main frame, and are integrally provided with rearward extensions 5.

Reinforcing plates 6 are provided between the main frame pipe 2 and the head tube 3. Supporting plates 7 are suspended from the plates 6, and are separated from each other in the right and left so as to suspend and support the front of an engine 8, such as, for example, a V-shaped vertically mounted water-cooled engine, which is also supported by the pillar 2a at its rear through plates 10. A radiator 9 is supported on the front side of the supporting plates 7.

Figure 5:
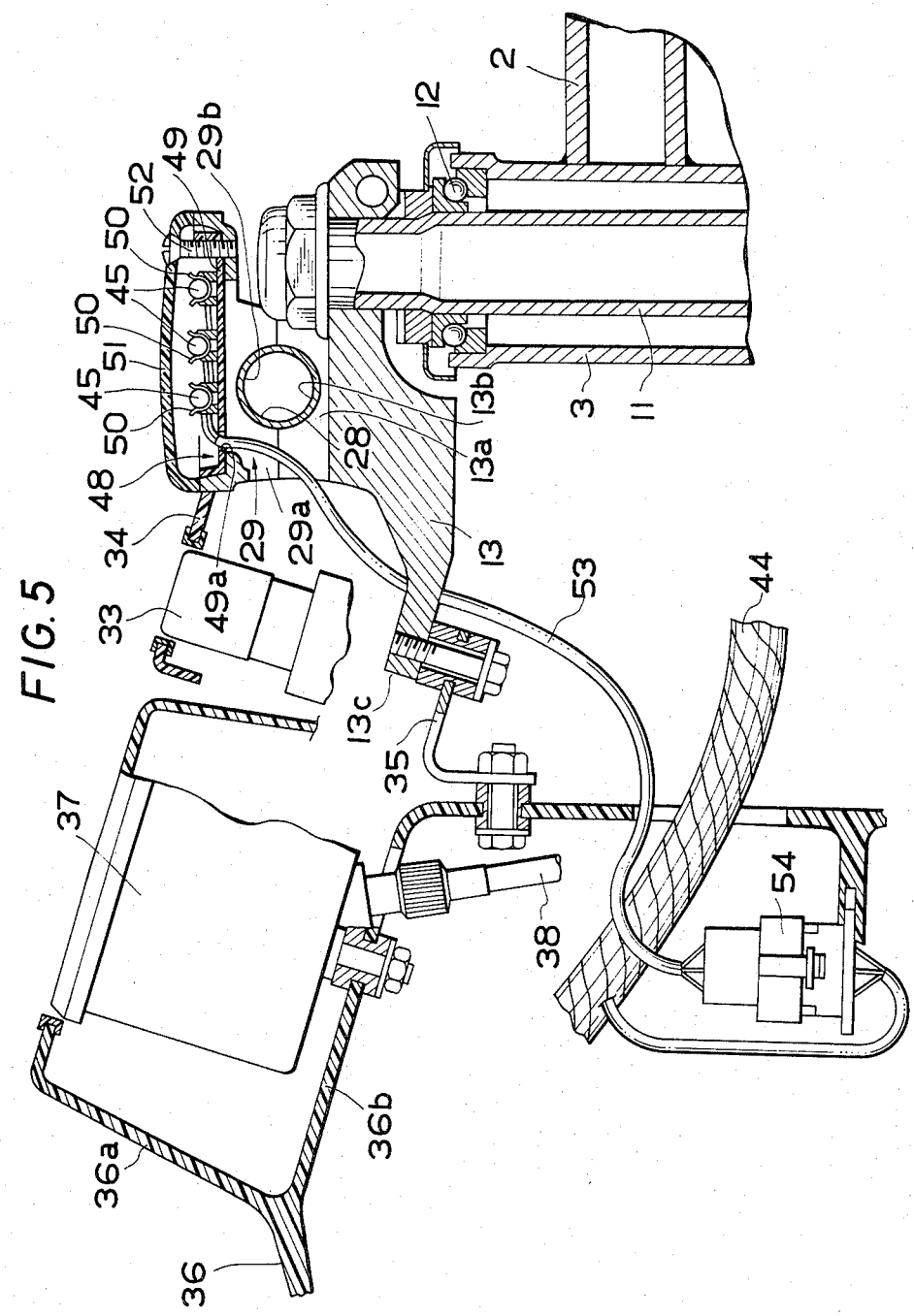
FIG. 5 is a vertically sectional view of the top bridge fixed upon a steering stem, and carrying a combined bracket for the meter case and headlight case.

A steering stem 11, passing through the head tube 3, is rotatably supported by bearings 12, as clearly shown in FIG. 5. A top bridge 13 and a bottom bridge 14 are rigidly connected to the upper and lower ends of the stem 11, respectively. Fork pipes 16, forming an inner tube of a front fork 15, are supported in their upper parts by the bridges 13 and 14.

A front wheel 18 is supported between bottom cases 17 forming an outer tube. A rear wheel 19 is supported through a rear fork 20 and cushion units 21. Fenders 22 and 23 are provided above the front wheel 18 and rear wheel 19, respectively. A fuel tank 24 is provided to straddle the main frame pipe 2. A seat 25 is provided behind the fuel tank 24. A taillight unit 26 is provided at the rear end of the rear fender 23. A headlight unit 27 is provided in front of the bridges 13 and 14.

A steering handlebar 28 is provided on the top bridge 13. The top bridge 13 is provided thereon with a pair of protuberant handlebar under-holders 13a (see FIG. 5) each having a semi-circular recess 13b. A handlebar upper-holder 29 is provided on its lower surface with a pair of legs 29a in the corresponding positions to the under-holder protuberances 13a and is fastened to the top bridge 13 with bolts 30 so that the bar 28 may be held between the recess 13b and recesses 29b provided on the lower surface of the legs 29a.

Referring to FIGS. 2-4, grips 28a are provided at both ends of the bar 28. A clutch lever 31 and brake lever 32 are provided respectively in front of the grips 28a. A bracket 34 for an ignition switch cylinder 33 is formed integrally with the handlebar upper-holder 29 to extend forwardly. Also, a cover 36 for a headlight case 27 is supported by a stay 35 connected to a flange 13c extended forwardly out of the top bridge 13. The headlight case cover 36 is integrally combined with a housing 36a for meter cases 37 of, for example, a speedometer and a tachometer. In the illustration, the meter cases 37 are connected to the housings 36a in several portions at the periphery and are screw-fastened and connected to the bottom wall 36b of the housing 36a, through which a meter cable 38 for transmitting the rotation from the wheel is extended. Turn signal lamps 39 are provided on both sides of the headlight 27. Switches 46 for the headlight 27, turn signal lamps 39, horn, and other electrical equipment are provided as separated on the right and left in adjacent positions to the grips 28a.

Referring back to FIG. 1, a battery 41 is held in a case or the like (not illustrated) in a space enclosed, for example, with the pillar 2a and the sub-frame 4 in the central part of the cycle body. One electrode of the battery is grounded through the frame or the like, but the other electrode is connected to a combination switch 43 through a main fuse 42 arranged adjacent to the battery. A wire harness 44, connecting the combination switch 43 with the fuse 42, is so wired as to be guided along the lower side of the main frame pipe 2. The combination switch 43 is provided in a predetermined position on the head tube 3 or the like.

The switches 46, i.e., 46a, 46b, ... 46n, are connected at one end to the electrical equipment load, such as the headlight bulb 27a, turn signal bulb 39, taillight bulb 26a, horn, etc., and are connected at their other end to one electrode of the switch 43 through a number of sub-fuses 45, i.e., 45a, 45b, ... 45n, corresponding to the number of the electrical equipment loads. The sub-fuses 45 are preferably, but not necessarily, concentratedly arranged downstream of the switch 43 and proximal the steering stem. It is possible to arrange the sub-fuses in a position proximal the steering stem, even if they are provided between the various electrical loads 27a, 39, 26a ... and the switches 46 for the respective loads.

The illustrated embodiment only shows one possible example of wiring according to the invention. In the illustrated embodiment, the headlight 27a is connected to the battery 41 through the main fuse 42, combination switch 43, one sub-fuse 45a of the sub-fuses 45, and one switch 46b of the load switches 46. In such case, a wire harness 47 for the taillight unit 26 wired along the upper side of the main frame pipe 2 is provided in addition to the wire harness 44 provided between the combination switch 43 and the main fuse 42. The turn signal lamps on the tail side are also connected to one of the sub-fuses and one of the load switches through a wire harness in a like manner.

The sub-fuses 45 are preferably, but not necessarily, concentratedly arranged as follows. In FIG. 5, there is provided a window 48 in the body 29b of the upper-holder 29 holding the handlebar 28 at the legs 29a on the top bridge 13. A bottom plate 49, made of a dish-shaped insulating member, is provided in the window 48 to define a chamber closed on the bottom and opened above, which is available as a fuse box. The fuses 45 are held in a substantially horizontal position on the plate 49 by metal holders 50. The open window 48 is closed with a lid 51 which is removably screwed to the body 29b by bolts 52 to present an enclosure on the upper surface of the top bridge 13.

The upper-holder 29 thus fitted with the fuses 45 therein is shown in the plan view in FIG. 4 with the lid 51 being removed. The bottom plate 49 is provided therein with a hole 49a (see FIG. 5) through which a wire harness 53 passes to be connected at one end with the fuses 45, and to be connected at its other end with the main wire harness 44 through a coupler 54 supported on the bracket 36.

Because the lid is easily removed to be opened, inspection and replacement of the sub-fuses can be readily accomplished. As a fuse box is formed on the top bridge, a dead space which has not been conventionally utilized, other than for a space for displaying a manufacturer's name label or other indicia can be effectively utilized. Further, the concentrated arrangement of the fuses can be made close to electrical loads, such as headlights, turnsignals, and horn, and to switches for the various loads provided on the handlebar. Therefore, the wire harnesses can be made as short as possible, and concentrated wiring can be attained. Furthermore, the fuse box is placed on the top bridge above the front fork assembly both, i.e., the bridge and fork assemblies, of which are rigid members so that the fuse box is positively protected from external forces, i.e., impacts.

In the above description, the sub-fuses are indirectly provided on the top bridges, namely, on and by means of the handlebar upper-holder, but may alternatively be provided directly on the top bridge.

Further, the fuse box may be formed integrally with a bracket for various meter cases and/or a cover for the headlight, connected or supported with the top bridge.

I claim:

1. An electrical wiring system for a motorcycle, comprising:
   an electrical battery;
   a main switch;
   electrical conductors operably and electrically connecting said main switch to said electrical battery;
   a plurality of electrical equipments;
   a plurality of sub-switches operably and electrically connected to each of said electrical equipments, respectively;
   said sub-switches being disposed adjacent to the handlebars of said motorcycle;
   a plurality of sub-fuses operably and electrically connected between said main switch and each of said sub-switches respectively;
   said plurality of sub-fuses being substantially concentratedly arranged above a top bridge supporting a steering handlebar and a front fork assembly of said motorcylce proximal a steering stem of said motorcylce;
   a steering handlebar upper-holder member which fixes said steering handlebar on said top bridge; and
   said plurality of sub-fuses being substantially horizontally arranged on said upper-holder member.

2. An electrical wiring system according to claim 1, wherein:
   said plurality of sub-fuses are mounted in a fuse box formed at an upper portion of said upper-holder member such that said substantially horizontally arranged sub-fuses may be easily inspected and replaced from above, by a maintenance person in a standing position; and
   said fuse box is provided with a removable lid.

3. An electrical wiring system according to claim 1 for motorcycles having a battery arranged substantially in the central part of the cycle body, wherein:
   said main switch is connected with said battery through a wire harness; and
   said sub-switches for the respective electrical equipments are arranged downstream of said main switch and on or near a handlebar of said motorcycle.

4. An electrical wiring system for a motorcycle having a battery arranged substantially in the central part of the cycle body, comprising:
   an electrical battery;
   a main switch connected with said battery through a wire harness;
   a plurality of electrical equipments;
   a plurality of sub-switches operably and electrically connected to each of said electrical equipments, respectively;
   said sub-switches being disposed adjacent the handlebars of said motorcycle and being arranged downstream of said main switch;
   a plurality of sub-fuses operably and electrically connected between said main switch and each of said sub-switches, respectively;
   said plurality of sub-fuses being substantially concentratedly arranged on a top bridge supporting a steering handlebar and a front fork assembly of said motorcycle proximal a steering stem of said motorcycle;
   a handlebar upper-holder which fixes said handlebar on said top bridge, said upper-holder being provided with a window;
   a chamber, opened above, being formed in said window; and
   said chamber having said plurality of sub-fuses contained therein and being closed by a lid removably disposed on said window.

5. A wiring system according to claim 4, wherein:
   said lid has a space for displaying indicia on its upper surface which is positioned in the central part of said top bridge.

6. A wiring system according to claim 3, wherein:
   said plurality of sub-fuses are arranged between said main switch and said sub-switches for said respective electrical equipments.

7. A wiring system according to claim 1, wherein:
   said handlebar upper-holder member is provided with a window;
   a chamber which is opened above is formed in said window; and
   said chamber has said plurality of sub-fuses substantially horizontally arranged therein, and is closed by a lid removably disposed on said window.

8. A wiring system according to claim 7, wherein:
   said lid has a space for displaying indicia on the upper surface thereof which is positioned in the central part of said top bridge.

* * * * *